United States Patent
Carrigan (10) Patent No.: US 7,982,757 B2
(45) Date of Patent: Jul. 19, 2011

(54) METHOD FOR REDUCING NOISE AND JITTER EFFECTS IN KVM SYSTEMS

(75) Inventor: Brian J. Carrigan, North York (CA)

(73) Assignee: Digital Multitools Inc., Richmond Hills, Ontario (CA)

( * ) Notice: Subject to any disclaimer, the term of this patent is extended or adjusted under 35 U.S.C. 154(b) by 1363 days.

(21) Appl. No.: 11/244,124

(22) Filed: Oct. 5, 2005

(65) Prior Publication Data

US 2006/0222081 A1    Oct. 5, 2006

Related U.S. Application Data

(60) Provisional application No. 60/667,716, filed on Apr. 1, 2005.

(30) Foreign Application Priority Data

Apr. 1, 2005    (CA) .................................. 2503400

(51) Int. Cl.
G09G 5/02    (2006.01)
(52) U.S. Cl. ........................ 345/694; 345/698
(58) Field of Classification Search .... 348/400.1–421.1; 375/240.01–240.24; 709/201–219; 345/694–698
See application file for complete search history.

(56) References Cited

U.S. PATENT DOCUMENTS

| | | | |
|---|---|---|---|
| 5,347,646 A | 9/1994 | Hirosawa et al. | |
| 5,499,377 A | 3/1996 | Lee | |
| 5,721,842 A | 2/1998 | Beasley et al. | |
| 5,884,096 A | 3/1999 | Beasley et al. | |
| 5,937,176 A | 8/1999 | Beasley et al. | |
| 6,008,847 A * | 12/1999 | Bauchspies | 375/240.01 |
| 6,070,253 A | 5/2000 | Tavallaei et al. | |
| 6,137,455 A | 10/2000 | Duo | |
| 6,219,695 B1 | 4/2001 | Guttag et al. | |
| 6,304,895 B1 * | 10/2001 | Schneider et al. | 709/203 |
| 6,324,605 B1 | 11/2001 | Rafferty et al. | |
| 6,378,009 B1 | 4/2002 | Pinkston, II et al. | |
| 6,378,014 B1 | 4/2002 | Shirley | |
| 6,388,658 B1 | 5/2002 | Ahern et al. | |
| 6,539,418 B2 * | 3/2003 | Schneider et al. | 709/203 |
| 6,738,100 B2 * | 5/2004 | Hampapur et al. | 348/702 |
| 2002/0038334 A1 | 3/2002 | Schneider et al. | |
| 2002/0072892 A1 | 6/2002 | Shirley | |
| 2002/0091850 A1 | 7/2002 | Perholtz et al. | |

(Continued)

OTHER PUBLICATIONS

KVM Buyers Guide; www.avocent.com/Cybex/PublicW2.nsf/4a7fe58a7d2fdfe886256a390072928b/3eee3450aa...; (2 pp); printed Sep. 12, 2002.

(Continued)

*Primary Examiner* — Alexander Eisen
*Assistant Examiner* — Nelson Lam
(74) *Attorney, Agent, or Firm* — The Webb Law Firm (57) ABSTRACT

In KVM systems for comparing new video frames to reference frames to update video, a method of reducing the effects of noise comprising (i) determining the differences between the sets of pixel values for new and reference pixels to produce a difference set of difference elements for each pixel; (ii) weighting the absolute value of each difference element within the difference set (iii) summing the weighted difference elements over all of the pixels of the horizontal line of the sub-block to produce a weighted difference element sum; (iv) determining whether the weighted difference element sum exceeds a predetermined sum threshold; (v) if yes, determining that the sub-block has changed so as to require updating.

6 Claims, 3 Drawing Sheets

U.S. PATENT DOCUMENTS

| | | | |
|---|---|---|---|
| 2003/0053538 A1* | 3/2003 | Katsavounidis et al. | 375/240.01 |
| 2003/0135656 A1 | 7/2003 | Schneider et al. | |
| 2004/0042547 A1* | 3/2004 | Coleman | 375/240.01 |
| 2004/0081238 A1* | 4/2004 | Parhy | 375/240.16 |
| 2004/0083256 A1* | 4/2004 | Chang | 709/200 |
| 2004/0120400 A1* | 6/2004 | Linzer | 375/240.16 |
| 2004/0205122 A1* | 10/2004 | Chang | 709/203 |
| 2004/0240551 A1* | 12/2004 | Itoh et al. | 375/240.16 |

OTHER PUBLICATIONS

FreeVision Extender; www.cccnetsys.com/products/free_vision_extender.asp (2 pp.); printed Sep. 12, 2002.

Design, Development & Remote Management Solutions for the Global Server Farm; www.ccnetsys.com/skip_intro.asp; (1 p.); printed Sep. 12, 2002.

Paragon, It's Time to Power Up; www.raritan.com; (2 pp.); printed Sep. 12, 2002.

Paragon, The Most Complete Enterprise-Class KVM Solution with Cat5 Simplicity™; www.raritan.com/products_paragon_index.html; (2 pp.); printed Sep. 12, 2002.

Poor Mouse Control Hurts Digital KVM Switch; www.nwfusion.com/reviews/2001/0115rev3.html; (5 pp.); printed Sep. 13, 2002.

KVM Switch Over IP; www.kvmswitchoverip.com; (2 pp.); printed Sep. 13, 2002.

DS 1800 Digital KVM Switch; www.e-business.com/products/DS1800.htm; (2 pp.); printed Sep. 13, 2002.

Avocent DS 1800; www.kvmoverip.com; (1 p.); printed Sep. 13, 2002.

What Is Digital KVM?; www.kvmoverip.com/whatis.digitalkvm.asp; (1 p.); printed Sep. 13, 2002.

\* cited by examiner

Figure 1a: Effect of Analog Noise on high frequency analog signal

Figure 1b: Effect of Low-Pass Filter on high frequency analog signal

Figure 2a: Possible Jitter in the H-Sync signal

Figure 2b: Ideal sampling.
Jitter at (A) could change the digital value from 5 to 4 or 6

Frame 0: Pixel 0{B:G:R} = {10,5,12}   Frame 1: Pixel 0{B:G:R} = {11,4,10}  Diff 0{B:G:R}={1:-1:-2}
Frame 0: Pixel 1{B:G:R} = {9,6,12}    Frame 1: Pixel 1{B:G:R} = {9,6,11}   Diff 1{B:G:R}={0:0:-1}
Frame 0: Pixel 2{B:G:R} = {10,7,11}   Frame 1: Pixel 2{B:G:R} = {11,12,8}  Diff 2{B:G:R}={1:5:3}

With a threshold of 1, Pixel 0 has R different, Pixel 1 has none different, and Pixel 2 has G and R different
With a threshold of 2, Pixel 0 has none different, Pixel 1 has none different, and Pixel 2 has G and R different.

Figure 3:    Difference Calculation

Figure 4: Interpolation of quarter-pixels

Original Samples
Interpolated Half-Samples
Interpolated Quarter-Samples

Frame 0: Pixel 0{B:G:R} = {10,5,12}   Frame 1: Pixel 0{B:G:R} = {11,4,10}  Diff 0{B:G:R}={1:-1:-2}={1+1+4}=6
Frame 0: Pixel 1{B:G:R} = {9,6,12}    Frame 1: Pixel 1{B:G:R} = {9,6,11}   Diff 1{B:G:R}={0:0:-1}={0+0+1}=1
Frame 0: Pixel 2{B:G:R} = {10,7,11}   Frame 1: Pixel 2{B:G:R} = {11,6,10}  Diff 2{B:G:R}={1:-1:-1}={1+1+1}=3

Correlation={6+1+3}=10

Figure 5: Calculation of correlation example

Using the pixel values as in Figure 3:

Diff 0{B:G:R}={1:-1:-2} => Weighted 0{0:0:1} => Sum={1}
Diff 1{B:G:R}={0:0:-1}  => Weighted 1{0:0:0} => Sum={0}
Diff 2{B:G:R}={1:5:3}   => Weighted 2{0:15:4} => Sum={19}    Difference Sum={1+0+19}=20

6a: If the difference threshold is <20, this pixel block is flagged; otherwise it is not 6b: The value of 15 for Weighted 2{G} exceeds the maximum weighting threshold of 14, thus flagging this pixel block, regardless of the difference threshold setting.

Figure 6: Calculation of differences example

Figure 7

METHOD FOR REDUCING NOISE AND JITTER EFFECTS IN KVM SYSTEMS

CROSS-REFERENCE TO RELATED APPLICATIONS

This application claims priority to provisional application Ser. No. 60/667,716 filed on Apr. 1, 2005.

FIELD OF THE INVENTION

This invention relates to the field of computer maintenance, and in particular, the field of computer network maintenance.

BACKGROUND OF THE INVENTION

As computer networks have become more and more extensive, the challenges associated with maintenance and control of such networks have become exponentially larger. In a typical setting, the operators of computer stations are not the same people as those who maintain the computer hardware and software. In the case of computer server hardware, there are no explicit operators, in the sense that computer servers are not used directly by users to do their work. Instead, users typically do their work at one of many computers connected to the server. Thus, in the case of computer servers, the servers are only used directly when maintenance is being performed on the server. As computer networks have become larger, it has become necessary to have specialized groups of people responsible for maintenance of computer equipment, including servers.

Maintenance of computers takes a number of forms. For example, it involves fixing computer equipment after it has failed. However, in an attempt to reduce downtime, many owners of computer networks have taken a preventative approach to maintenance. Preventative maintenance includes monitoring for problems, solving problems after they are detected, and deploying upgrades to prevent future problems. Maintenance may also include the adding of features, applications and data to the computer.

The increased size of computer networks has also led to a change in the physical arrangement of networks, and the way they are communicated with by maintenance personnel. Often, computer networks are very large, and may include hundreds or even thousands of servers located in separate server rooms far removed from the location of maintenance personnel. Therefore, direct use of the servers by maintenance personnel is impractical. Furthermore, even if the maintenance personnel are on location, it is impractical for them to conduct maintenance activities on hundreds or thousands of target computer servers by moving physically from one server to the next.

One basic requirement for maintenance personnel, in accomplishing their task of monitoring the target computers, is that the status information being monitored be made available to the maintenance personnel. There are two main categories of target computers that maintenance personnel would typically monitor. The first consists of computers that are primarily based on a graphical interface, and the second consists of computers that are primarily based on a command line interface. In graphical interface-based computers, such as those using the Windows™ operating system, the system information is available as a graphical display on the target computer's screen. Therefore, to have this information, maintenance personnel at a remote location must have access to the target computer's video in order to monitor the target computer.

In command line-based computers, such as those using Unix™ or Unix-derivative operating systems, a log file is generally available with periodic status reports. This log file would be available to a local user of a computer and could be displayed on the screen. For maintenance personnel to monitor such a computer, they need to have access, at the remote location, to this log file.

In addition, maintenance personnel must be able to choose among various types of information available from the target computer in order to monitor effectively. This involves the maintenance personnel having access to the standard input devices of the target computer. Typically, the standard input devices are the keyboard and mouse, but they may also include such items as graphic tablets and serial console ports.

Conducting maintenance activities involving upgrades also requires control of the target computer. This includes having access to the screen shot or log file, and the standard input and output devices of the computer. It is also necessary for maintenance personnel to have access to the media on which the upgrade information are stored. If the medium is, for example, a CDROM or floppy disk, the maintenance personnel have historically needed to be physically present at the target computer to insert the CDROM and swap CDROMs as required.

In the past, to provide the necessary access for maintenance personnel to the target computers, "KVM" switches were developed. "KVM" stands for Keyboard Video and Mouse. The purpose of a KVM switch is to provide remote access to a target computer.

Early KVM switches were analog, connecting one or more target computers and one or more remote users. This would allow a remote user to select, usually by moving a mechanical switch, which target computer's keyboard, video and mouse he would have access to.

Analog KVM switches can be relatively inexpensive. As well, their "perceived performance" can be quite good, meaning that a user accessing a target computer from a remote location from an analog KVM switch will have an experience very similar to the experience he would have if he were using the target computer directly. However, analog KVM switches have a number of disadvantages. Very basic analog KVM switches require the operator to be co-located with the target computers. In other words, if a user wishes to have access to eight different computers through a basic analog KVM switch, he must be co-located with those eight computers, and can access each one in turn by actuating the switch. To use analog KVM switches in circumstances where the user is located remotely from the target computers, analog KVM extenders are required. However, even analog KVM extenders often place strict constraints on the physical distance between the user the target computers. Such extenders typically require that the user be located within 300 meters of the target computers.

Another disadvantage of analog KVM switches is that they are not easily scalable. In other words, creating networks of KVM switches, and adding additional target and remote computers to that network is difficult, usually resulting in escalating costs and reduced performance. U.S. Pat. Nos. 5,721,842; 5,884,096; 5,937,176; 6,378,009; and 6,388,658 disclose various analog KVM switches and extenders having these disadvantages.

Another related problem with analog KVM switches is that if the remote site is far removed from the target site, the receiver of the KVM switch must be hand-tuned for optimal video performance. Without such hand tuning, the video quality at the remote computer suffers, resulting in an lower-than-optimal perceived performance. The requirement of hand-tuning makes the installation of a network of analog of KVM switches cumbersome and expensive.

Subsequent to the development of analog KVM switches, digital KVM switches were developed. A digital KVM switch is typically connected on one side to a target computer. The other end of the switch is connected to a LAN port, and ultimately to the internet or another network. The remote computers receive the target video, and transmit keyboard and mouse signals, over that network. Unlike the analog approach to switching video, keyboard and mouse information, the digital KVM digitizes the video received from the target computer, and then transmits it to the remote computer via the LAN link.

Digital KVMs may also be attached to multiple target computers via an analog KVM switch. This allows the digital KVM switch to access more than one target computer. In some products, the digital KVM and analog KVM are integrated into the same unit.

A typical digital KVM switch consists of an analog-to-digital converter (ADC) for capturing the target's video signal and converting it to digital format; a frame storage device, sometimes referred to as a "frame grabber"; and a CPU. U.S. Pat. No. 6,539,418 discloses a KVM switch with these general features.

A typical target computer puts out a video signal containing a very large amount of raw data. A typical video resolution is 1024 pixels per horizontal video line, with 768 lines per video frame and 60 complete frames transmitted per second. Each pixel on a colour monitor may have a red component, a green component and a blue component. Most computers use 8 bits of information for each of these components, resulting in a 24-bit colour word representing each pixel. In this example, then, the target video signal consists of 1,132,462,080 bits per second (1.132 gigabits). This bit rate is substantially higher than the capacity of any practically-available LAN connection. As a result, digital KVM devices typically use some form of video data reduction technology. One approach is to compare successive video frames and extract pixel differences between successive frames. This uses far less bandwidth then transmitting every whole new frame to the remote computer. In one typical difference calculation method, the digital KVM switch captures an entire video frame. After the entire new video frame is captured, each pixel is compared with the corresponding pixel in the previous video frame. Once all the pixel changes have been determined, the differences between the new frame and the previous frame are sent to the remote computer, and the video on the remote computer is updated to match the new frame that has been received from the target computer.

There are different ways to update the remote or control computer. One is to update each individual pixel that has changed from the reference (i.e. previous) frame to the new frame. Another is to update an entire sub-block of the target computer's screen if any pixel within that sub-block has changed between the reference frame and the new frame. In some applications, the update units are 16-pixel by 16-pixel sub-blocks, because this is the size of block used by the public domain VNC protocol for transmitting video.

A typical video signal has a particular predetermined resolution which specifies the number of pixels per line, and the number of lines per video frame. In the analog domain, each line of video has an active area, where the actual screen picture information is contained, and a blanking area, usually represented in the colour black. The blanking area is added to each line to provide the extra time between lines for re-positioning the scanning electron beams that create the image on the screen. The blanking area at the end of each line also contains a horizontal-sync or H-sync signal pulse, which the monitor uses to determine when the electron beam should realign itself. Similarly, the video frame as a whole has an active area and a blanking area containing lines not included in the active video region. The vertical-sync or V-sync pulse is transmitted within this blanking area. This pulse is used by the CRT to cause the electron beam to move back to the beginning of the frame. The time between successive H-sync pulses is arbitrary, but will be constant for a particular implementation of a particular video rate or resolution.

With digital KVM, the ADC of the KVM must extract each pixel from the analog video signal's waveform. This is accomplished by sampling. Ideally, sampling will take place at the precise center of the time allocated to each pixel. The pixels are located for sampling with reference to the sync pulses. In particular, there is typically associated with the ADC a phase-locked loop (PLL) that uses the information from the H-sync and V-sync signals to recreate the sampling clock (also called the pixel clock) of the analog video.

Analog signals are continuous and varying, and as such, are susceptible to additive noise. When such a signal is digitized, the noise is digitized along with the ideal analog signal. The result is that the noise manifests itself as a slight change in the digital information, even if the analog information is intended to be static. Thus, in the present application, the value of a particular pixel may not have actually changed between the reference frame and the new frame, but may appear to have changed because of additive noise. In such a case, the typical difference-detecting and generating algorithm would detect a change from the reference frame to the new frame, and would transmit these changes to the remote computer. Since the underlying analog video screen was intended to be static (i.e. unchanged from one frame to the next), these extra transmissions have no purpose, but create unnecessary traffic in the overall system, resulting in slower response times and a less smooth motion on the video screen of the remote computer.

There have been attempts in the past to improve the situation by reducing the effect of noise on the digitized video. Specifically, the typical approach has been to pass the analog video through a low pass filter. However, this can have a deleterious effect on the signal, because the video signal typically includes substantial high frequency components which will be filtered out by the low pass filter, thus smoothing out the edges of the signal. As a result, high frequency information, such as text, gets blurred.

A related problem is caused by jitter in the H-sync. Typically, the PLL will use the rising edges of the H-sync pulses to generate a sampling clock. However, if the pulse jitters, causing it to begin sooner or later than intended, the PLL will generate a misaligned sampling clock that samples away from the middle of each of the pixels. Excessive jitter in the H-sync signal will translate into excessive misalignment in the pixel sampling clock. The result will be that the sampling clock may be so misaligned as to sample on the transition between pixels, rather than on the pixel itself. This can change the sampled value significantly from the correct valve. Thus, misalignment may also cause it to appear as if changes in the target computer's video information have taken place, when, in fact, none have.

SUMMARY OF THE INVENTION

What is preferred is a method for reducing the probability that additive noise will create the appearance of changes between a reference video frame and a new video frame when no such change has actually occurred in the actual video pixels. Also preferred is a method that reduces the likelihood of H-sync jitter creating an appearance of changes between a reference video frame and a new video frame when no such changes have actually occurred.

In one aspect of the invention, there is provided a method of determining whether a sub-block has changed so as to require updating, for use in association with a system for updating the video of a remote computer in response to changes in the video of a target computer by comparing a reference video frame from the target computer with a new video frame, wherein updated frame sub-blocks of pixels that each have a set of pixel values associated therewith are sent to the remote computer to update it if it is determined that the sub-block has changed so as to require updating, the method comprising the steps of:

A) for the first horizontal line of the sub-block, performing the following steps:
 (i) comparing each new video frame pixel with each corresponding reference video frame pixel by determining the differences between their corresponding sets of pixel values to produce a difference set of difference elements for each pixel;
 (ii) weighting the absolute value of each difference element within the difference set according to a predetermined weighting rule to produce a weighted difference set of weighted difference elements for the pixel, the weighting rule being configured so that the weight given to any difference element not exceeding a predetermined basic threshold is zero, and the weight given to any difference element exceeding the predetermined basic threshold is greater than zero and is non-decreasing with the size of the absolute value of the difference element;
 (iii) summing the weighted difference elements over all of the pixels of the horizontal line of the sub-block to produce a weighted difference element sum;
 (iv) determining whether the weighted difference element sum exceeds a predetermined sum threshold; and
 (v) if yes, determining that the sub-block has changed so as to require updating; and
B) repeating step A for the each subsequent horizontal line of the sub-block (I) if and only if step A has not been performed for all of the horizontal lines in the sub-block; and (II) if it has not been determined that the sub-block has changed so as to require updating.

Optionally, the said step B comprises repeating step A for the each subsequent horizontal line of the sub-block (I) if and only if it has not been determined that the sub-block has changed so as to require updating; and (II) if and only if step A has not been performed for all of the horizontal lines in the sub-block. Optionally, the weighting rule is configured such that the weighting increases geometrically with each increment of the difference element when the difference element is greater than the basic threshold. Optionally, the weighting rule is configured such that the weighting increases arithmetically with each increment of the difference element when the difference element is greater than the basic threshold. Preferably, the method comprises the steps, after the said step (ii), of (1) determining whether any weighted difference element exceeds a predetermined single-pixel threshold; (2) if any weighted difference element exceeds a predetermined single-pixel threshold, determining that the sub-block has changed so as to require updating and immediately after the said step (2), of proceeding directly to the said step B. Optionally, the weighting rule is configured so that the weight given to any difference element increases with the absolute value of the difference element until a weighting cap is reached.

In another aspect of the invention, there is provided a method of estimating an ideal sampling timing, for use in association with a system for updating the video of a remote computer in response to changes in the video of a target computer, wherein the system uses an analog-to-digital converter to sample the incoming analog video signal from the target computer to obtain digital pixel values associated with each pixel of the incoming analog video signal, and wherein a sampling clock for controlling sampling timing is generated with reference to the H-sync signal, wherein the digital pixel values are used for comparing a reference video frame from the target computer with a new video frame, the method comprising the steps of:

receiving a primary horizontal line of pixels of the new video frame positioned between consecutive H-sync pulses, sampled according to the sampling clock;

creating a plurality of time-shifted lines of pixels that are equivalent to the primary line of pixels but are time-shifted relative thereto;

performing a correlation calculation to determine, from among the primary and time-shifted lines of pixels, which line of pixels correlates most closely with a corresponding line of pixels from the reference frame; and determining the line of pixels that correlates most closely as the new video frame line to be compared with the corresponding line of the reference frame.

Preferably, the creating step comprises the step of creating lines of pixels shifted by minus-three-quarters of a pixel clock period, minus-one-half of a pixel clock period, minus-one-quarter of a pixel clock period, plus-one-quarter of a pixel clock period, plus-one-half of a pixel clock period and plus-three-quarters of a pixel clock period. Preferably, wherein the performing step comprises determining the differences between each pixel in the line of pixels and its corresponding reference frame pixel to produce a difference set of difference elements in respect of each pixel, and summing the squares of the difference elements, wherein the lowest sum corresponds to the highest correlation.

In another aspect of the invention a system for receiving a video signal from a target computer and updating the video of a remote computer in response to changes in said video signal, the system comprising a KVM device configured to be connectable to a remove computer and a target computer, wherein the KVM device is configured to execute the methods described herein.

BRIEF DESCRIPTION OF THE DRAWINGS

The invention will now be described, by way of example only, with reference to the attached drawings, which illustrate the preferred embodiment of the invention, and in which.

DETAILED DESCRIPTION OF THE PREFERRED EMBODIMENTS

Figure 7:
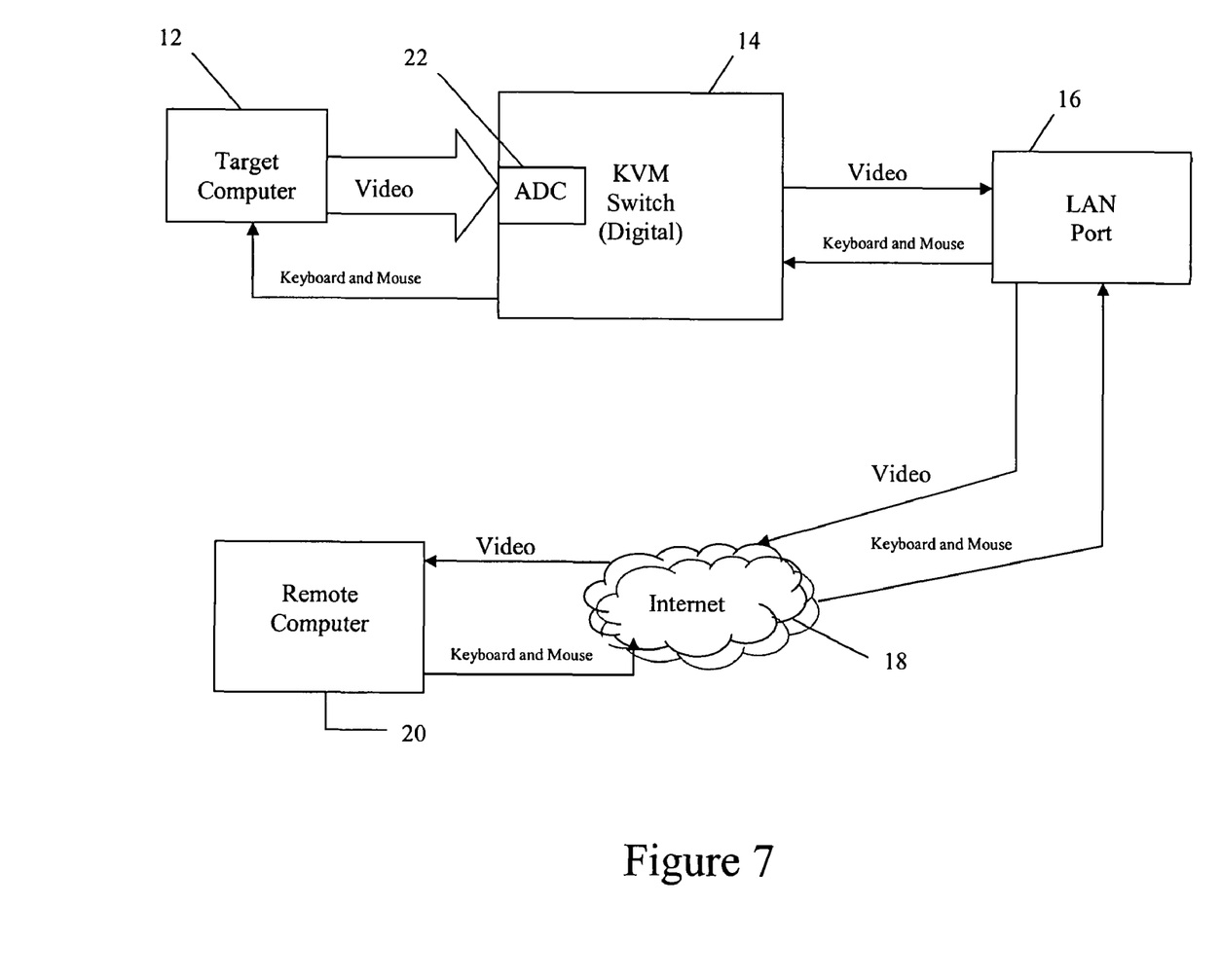
FIG. 7 is a schematic diagram of a KVM system.

A typical environment in which the present invention may be used is shown schematically in FIG. 7. FIG. 7 shows a target computer 12 which is being controlled remotely by the remote computer 20. The video signal from the target computer 12 is fed to the KVM switch 14 via, inter alia, an analog-to-digital converter 22. The video, after having been processed by the KVM switch 14, is fed via the LAN port 16 and the Internet 18 to the remote computer 20. In this environment, the keyboard and mouse of the remote computer 20 are used as input devices for the target computer 12. Therefore, the keyboard and mouse signals are fed from the remote computer 20 via the Internet 18, LAN port 16 and KVM switch 14 to the target computer 12. The user using the remote computer 20 to control the target computer 12 will, in response to what he sees from the target computer's video output, send commands to the target computer 12 via the keyboard and mouse. This will, in turn, affect the status of the target computer 12, including its video output, and the dialogue will continue until the user's task is complete.

For the purposes of bandwidth reduction, the KVM 14 will typically update the video of the remote computer 20 in response to changes in the video of the target computer 12 by comparing a received new video frame to a reference video frame (i.e. typically, the previously received video frame). Based on this comparison, if the KVM 14 determines that a sub-block of pixels has changed sufficiently so as to require updating, then it sends an updated version of that sub-block to the remote computer. If, by contrast, the sub-block has not changed sufficiently so as to require updating, then it is not updated.

As the ADC 22 receives the video signal from the target computer 12, the pixels are digitized by means of sampling. As the video signal being received by the ADC 22 is analog, no sampling clock is provided to the ADC 22. Thus the ADC 22 must generate its own sampling clock (i.e. pixel clock) to sample the analog video signal in order to digitalize the pixels. Thus, typically, the ADC 22 will use the H-sync signal associated with the incoming video signal as a reference point to generate the sample clock.

Figure 2A:
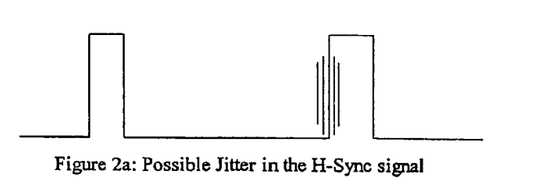
FIG. 2a is a schematic illustration of jitter in an H-sync signal.
Figure 2B:
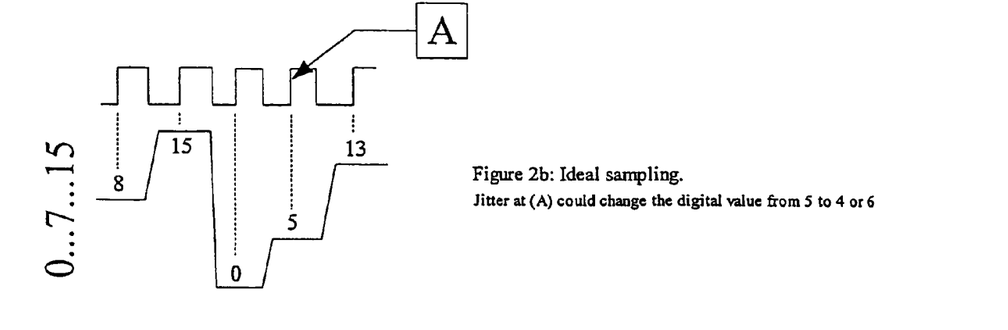
FIG. 2b is a schematic illustration of an ideal pixel sampling scenario.

FIG. 2b shows an ideal sampling scenario, in which the pixels are each sampled in the middle of the pixel period. The middle of the pixel is the most preferred point for sampling because its gives the most precise digitized pixel values. By contrast, sampling the near the edges of the pixels may result in the analog video signal being sampled while in transition between pixels, thus giving an inaccurate pixel value.

FIG. 2a illustrates the possibility of jitter in the H-sync signal. For the purposes of the H-sync signal, jitter is defined as variations between consecutive rising edges of the H-sync signal. If the period between H-sync signal pulses varies, then this will affect the accuracy of the pixel clock, and may result in sampling that renders inaccurate pixel values.

Figure 1A:
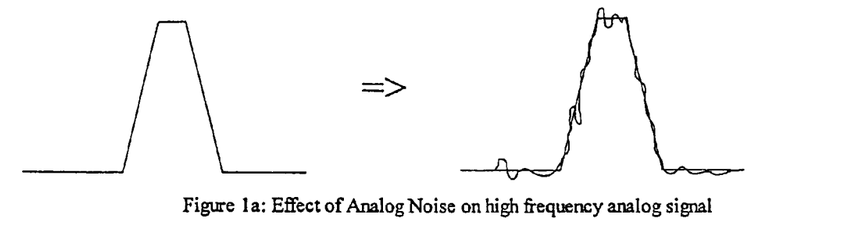
FIG. 1a is a schematic illustration of the effect of analog noise on a high-frequency analog signal.

FIG. 1a shows the effect of additive noise on a high-frequency analog signal. The noise changes the shape of the analog wave form, and, depending on the amount and nature of the noise, and on the timing of the sampling, may result in incorrect pixel values when the pixel is sampled.

Figure 1B:
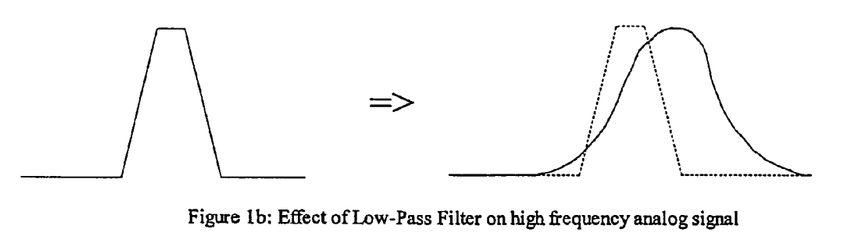
FIG. 1b is a schematic illustration of the effect of a low-pass filter on a high-frequency analog signal.

The classic approach for reducing noise on an analog signal is to pass the signal through a low pass filter that filters out noise having a higher frequency then the analog signal. FIG. 1b shows the effect of a low-pass filter on an analog signal. Specifically, in the case of a high-frequency analog signal (e.g. text), the edges of the signal get smoothed out, and the high frequency information gets blurred.

Typically, the KVM 14 receives the analog video signal from the target computer 12, digitizes it, and then compares the pixel values between a new frame and a previous frame. If a sub-block of pixels within the frame has changed, the sub-block is updated at the remote computer. Typically, the sub-block will be 16×16 pixels to allow easy use of the public domain VNC protocol for video signals. However, other sub-block sizes are possible. Alternatively, apart from a sub-block (i.e. a block composed of at least a plurality of pixels), updating can be performed on individual pixels, though this is not preferred.

Figure 3:
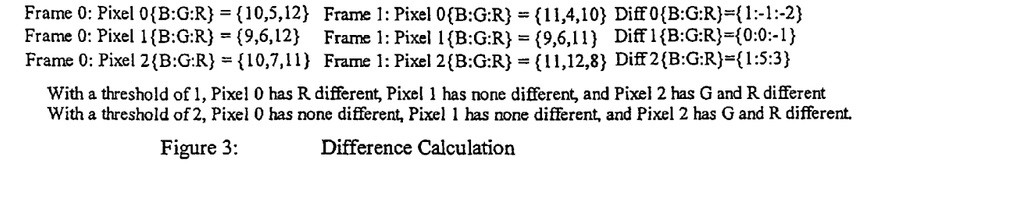
FIG. 3 is an illustration of an ordinary difference calculation between a sub-block of a new frame and a reference frame.

FIG. 3 shows a typical difference calculation. As can be seen, the values shown in FIG. 3 are pixel values for a video signal from a colour monitor. As such, for each pixel, there are three pixel values, namely, blue, green and red wherein the intensity of each colour is reflected by its corresponding pixel value. For a monochrome screen, there may only be one pixel value for each pixel. In general, a pixel value is a value that corresponds to a variable aspect of the appearance of the pixel.

In FIG. 3, an example sub-block of three pixels is used. The reference frame, frame 0, has three pixels, namely, 0, 1, and 2. Thus, for example, frame 0, pixel 0 has a pixel value set of $\{10, 5, 12\}$. Frame 1, pixel 0 has a pixel value set of $\{11, 4, 10\}$. When these two pixels are compared, the differences between the corresponding pixel values in each pixel are subtracted. In other words, the pixel value set from frame 0, pixel 0 is subtracted from the pixel set for Frame 1, pixel 0 to produce a difference set having a series of difference elements. In the case just discussed, the comparison is done by performing the following operation: $\{11, 4, 10\} - \{10, 5, 12\} = \{1, -1, -2\}$.

It will thus be appreciated that when a reference frame pixel value set is subtracted from a new frame pixel value set, the result is a difference set of difference elements, with each difference element representing the difference between two corresponding pixel values (in this example, the pixel values are blue, green and red). In the ordinary difference calculation, this calculation is performed for each pixel in the frame.

Also, for each pixel, each difference element in each difference set is compared with a predetermined threshold. If any difference element precedes the predetermined threshold, indicating a substantial difference, then the pixel corresponding to that difference element is found to be different, and the sub-block in which that pixel is located is updated. In the example in FIG. 3, assuming a threshold of 1, pixel 0 is deemed to be different because its red difference element is different. Pixel 1 is deemed not to be different, because none of its difference elements exceeds the threshold. Pixel 2 is deemed to be different because its green and red difference elements exceed the threshold. If a threshold of two is used, pixels 0 and 1 are not deemed to be different, while pixel 2 is deemed to be different because its green and red difference elements exceed the threshold. An example of an ordinary difference calculation can be found in my U.S. patent application Ser. No. 10/775,306 filed Feb. 10, 2004 and incorporated herein by reference. However, as explained above, this ordinary difference calculation process does not include any specific means for dealing with the problem of noise, or the problem of H-sync jitter.

To account for horizontal jitter, a method is preferably provided which estimates the ideal sampling timing, and, thus, estimates the accurate, "non-jittery" location of the H-sync signal. (For brevity, this method will be referred to as the "Jitter Reduction Method"). First, a horizontal line of pixels positioned between consecutive H-sync pulses is received, having been sampled according to the sampling clock generated by the ADC 22. The line of pixels is preferably an entire line from the new frame. This primary horizontal line of pixels preferably extends across the entire frame, and is the line of pixels that was sampled according to the H-sync signal as it was read by the ADC 22. Because jitter might have affected the H-sync signal, and caused it to start early or late, thus deleteriously effecting the accuracy of the sampling, a plurality of time-shifted lines of pixel is created. These time-shifted lines of pixels are equivalent to the primary line of pixels but are time-shifted relative thereto. Preferably, there will be six time-shifted lines of pixels created. These lines are shifted by minus-three-quarters of a pixel clock period, minus-one-half of a pixel clock period, minus-one-quarter of a pixel clock period, plus-one-quarter of a pixel clock period, plus-one-half of a pixel clock period and plus-three-quarters of a pixel clock. Thus, after this step, there are seven lines of pixels in the preferred method: one primary line of digitized pixels that was produced the ADC 22 and six time-shifted lines of pixels.

Figure 4:
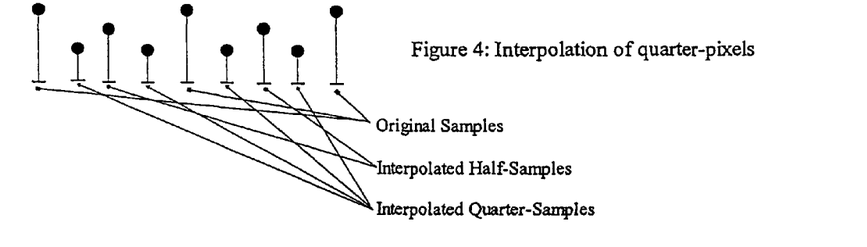
FIG. 4 is an illustration of interpolation of quarter-pixel lines.

It will be appreciated by those skilled in the art that the six quarter-pixel lines are generated by using a pixel doubler and digital low-pass filter to create two half-pixel lines, and then repeating the process using a pixel doubler and digital low-pass filter to create the other four time-shifted lines. The result of this process is shown at FIG. 4. In FIG. 4, the primary lines of pixels are labelled as "original samples" the six time-shifted lines are labelled as "interpolated half-samples" and "interpolated quarter-samples".

Figure 5:
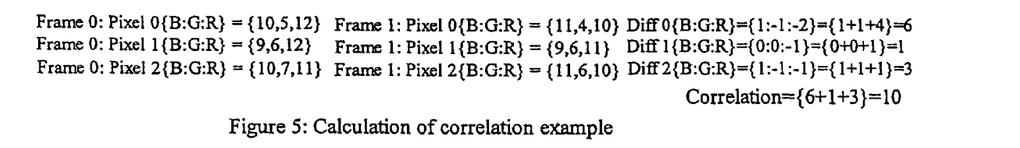
FIG. 5 is an illustration of a correlation calculation.
Figure 6:
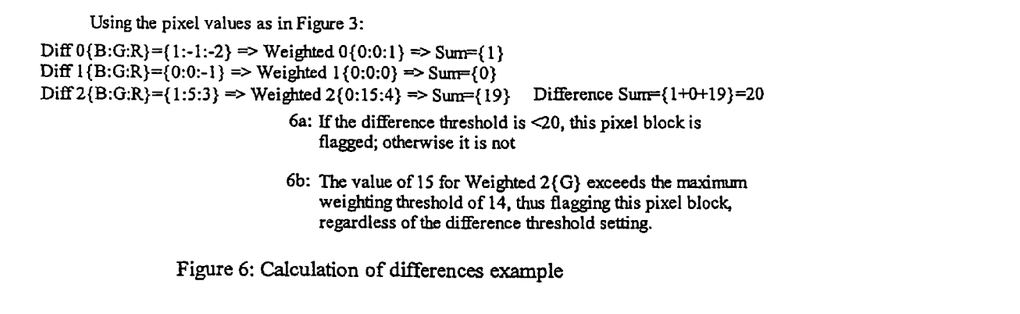
FIG. 6 is an illustration of a difference calculation.

Next, each line of pixels, including the primary line of pixels and the time-shifted lines of pixels is correlated with the corresponding line of pixels in the reference frame. An example correlation calculation is shown at FIG. 5. The correlation calculation involves comparing each pixel in each of the primary and time shifted lines of pixels, to each corresponding pixel in the reference frame. This comparison generates a difference element for each pixel value/colour of each pixel. The difference elements are each squared and summed over the entire line of pixels to determine a correlation. The line of pixels from among the primary and time-shifted lines of pixels with the lowest sum is the most highly correlated with the corresponding reference frame line of pixels.

It is assumed that the line of pixels from the among the primary and time-shifted lines of pixels that correlates most closely with the corresponding reference frame line of pixels is the line of pixels that was most accurately and ideally sampled. This assumption is based on the fact that, in general, smaller changes from the reference frame to the new frame are more likely then larger changes. Thus, the line of pixels, chosen from among the primary and time-shifted lines of pixels, which correlates most closely with the corresponding reference frame line of pixels, probably corresponds most closely with the ideal, most accurate, sampling scenario. Therefore, the line of pixels that correlates most closely is determined to the be the new video frame to be used in the comparison with the corresponding reference video frame line of pixels.

It will be appreciated that other types of correlation calculations besides the one described above are comprehended by the invention. What is important is a correlation calculation be performed, to determine, from among the primary and time-shifted lines of pixels, which line of pixel correlates most closely with a corresponding line of pixels from the reference frame.

In the preferred embodiment, once the Jitter Reduction Method has been performed, the method, described in detail below, for determining whether a sub-block has changed so as to require updating, will be performed. (For brevity, this method will be referred to as the Noise Reduction Method). It will be appreciated, however, that the two methods may be performed separately, without being combined. For example, in an environment where jitter is a particularly serious problem, but noise is not, the Jitter Reduction Method could be implemented alone. By contrast, where the H-sync signal is not jittery, but the incoming analog signal is noisy, then the Noise Reduction Method can be executed alone.

In this method, preferably, a series of steps is carried out on each horizontal line of the sub-block. The first step is to compare each new video frame pixel with each corresponding reference frame pixel by determining the differences between their corresponding sets of pixel values to produce a difference set (i.e. a set of difference elements) for each pixel.

The next step is to weight the absolute value of each difference element within the difference set according to a predetermined weighting rule to produce a weighted difference set (i.e. a set of weighted difference elements) for the pixel. In this context, "weighting" refers conceptually to multiplying the difference element by a factor so as to give the difference element a weight corresponding to the size of the factor. Thus, a difference element that is given a "weight" of two is weighted twice as heavily as a difference element given a "weight" of one. Preferably, the weighting rule is configured so that the weight given to any difference element not exceeding the predetermined basic threshold is zero, and the weight given to any difference element exceeding the predetermined basic threshold is greater than zero and non-decreasing with the size of the absolute value of the difference element.

It will be appreciated that the "basic threshold" corresponds conceptually to the threshold used in the ordinary difference calculation illustrated in FIG. 3. At or below the basic threshold, the pixel is deemed not to have changed at all, for practical purposes. It will be appreciated by those skilled in the art that the threshold is chosen so that any change not exceeding the threshold does not, for practical purposes, justify using bandwidth to update the remote computer 20, as the visual difference for changes at or below the threshold for the user of the remote computer would be negligible.

For difference elements exceeding the basic threshold, the weighting rule will most preferably weight difference elements higher (i.e. more heavily) as their absolute value increases. This weighting rule is based on the assumption that the greater the amount by which a difference element exceeds the threshold, the less likely it is that the difference element reflects only noise. Rather, as the size of the difference element increases, it is much more likely that the difference element is the result of an actual change in the video signal. It will be appreciated, however, that once the difference element reaches a certain level, increasing its weighting for each increase in the absolute value of the difference is unnecessary, since the weighting is already quite high. Thus, one possible weighting rule is that the weighting increases until a weighting cap is reached, at which point the weighting remains constant at the weighting cap as the absolute value of the difference elements increases beyond the level at which the cap took effect.

Other weighting rules are also possible. For example, the weighting rule could be configured such that the weighting increases geometrically with each increment of the difference element when the difference element is greater than the basic threshold. Alternatively, the weighting rule could be configured such that the weighting increases arithmetically with each increment of the difference element when the difference is greater than the basic threshold. Still other weighting rules are also comprehended by the invention. What is important is that any difference element exceeding the basic threshold be given a weight greater than zero and that the weighting given to difference elements is non-decreasing as the value of the difference element above the basic threshold increases.

In the next step, the weighted difference elements for all of the pixels of the horizontal line of the sub-block are summed to produce a weighted difference element sum. Then, it is determined whether the weighted difference element sum exceeds a predetermined sum threshold. If yes, it is determined that the sub-block has changed sufficiently so as to require updating. It will be appreciated that the predetermined sum threshold will preferably be selected such that, on the one hand, apparent changes in the video signal that are primarily related to noise rather than to actual changes will not cause the sub-block to be updated, while, on the other hand, apparent changes in the video signal that are probably real (i.e. not the result of noise) will cause the sub-block to be updated. Thus, the selection of both the sum threshold and the basic threshold depends on various factors, including the nature of the typical video signal that will be processed, and the noise level in the environment in which the video signal will be sent and received.

It will be appreciated that this preferred method of weighting and summing may, in some circumstances, cause legitimate, real, non-noise-related changes in the video signal not to be detected, particularly around the edges of the sub-block. This would happen if changes take place at the edge of the sub-block, but not in its central area. Thus, when the summing of the weighted difference elements takes place, the sum over the entire line may be low because of the lack of changes in the central area of the sub-block, yet there may be real changes in the video content at the edges of the sub-block. One way this eventuality can be dealt with is to compare each weighted difference element to a predetermined single-pixel threshold and determine whether any weighted difference element exceeds that single-pixel threshold. If yes, then, in this alternative, it will be determined that the entire sub-block has changed sufficiently so as to require updating. This alternative approach ensures that if a single pixel changes sufficiently beyond a predetermined single-pixel threshold, then the sub-block will be updated regardless of the result of the summing step.

There are two main ways to implement the functions of the Jitter and Noise Reductions Methods: hardware and software. In a hardware implementation, the hardware will preferably perform the main functions of both methods, including low-pass calculation, weighing calculation (preferably implemented as a look up table), threshold comparison, and storage of flag that mark sub-blocks to be updated. Preferably, a Field Programmable Gate Array (FPGA) and memory are used for these functions. An FPGA is preferred because it is programmable, and therefore somewhat flexible, yet very fast. An FPGA can generally perform these methods faster than software implementations, and are thus useful for high-data-rate applications.

By contrast, a software implementation preferably uses a processor and memory. A software implementation is generally more flexible than hardware, but generally slower.

It will be appreciated that, if it is determined that any weighted difference element exceeds the single-pixel threshold, the method could stop executing on the current sub-block (since it has already been determined that it will be updated, and skip to the next sub-block. The same is true if the sum of difference elements for a line of a particular sub-block exceeds the sum threshold.

In a full or partial software implementation, it is generally preferred for the method to stop executing on the current sub-block once it has been determined that the current sub-block will be updated. This is because there is no point wasting CPU cycles on unnecessary operations, particularly when CPU time could be more efficiently allocated elsewhere. Also, it is relatively simple to program the CPU to check if the sub-block has been flagged for updating, and stop executing the method on that sub-block if it has been flagged.

By contrast, in a hardware implementation, it is generally preferred that the Noise Reduction Method continue to execute on the remainder of the sub-block even if the sub-block has already been flagged for updating. This is because hardware generally performs the method "on the fly", meaning that the method is being executed as each line is received from the ADC (as opposed to storing the whole frame, then receiving each line consecutively from storage and performing the method, which would be the usual software implementation). Thus, the hardware has to wait for the entire sub-block to be received before it can act on the next one. In light of this, it is actually simpler to the hardware to continue executing the method on a sub-block that has already been flagged, since the hardware is dedicated to this method anyway. Furthermore, it would actually require extra circuits to configure the hardware to detect if the sub-block has already been flagged and stop executing the method if the sub-block has been flagged.

Once the summing and determining steps have been completed for a particular line of the sub-block, the steps described above are repeated for the next line of the sub-block if and only if they have not already been performed for all of the horizontal lines in the sub-block.

It will be appreciated that the Jitter Reduction Method and Noise Reduction Method can be performed together. Most preferably, Jitter Reduction Method will be performed first, as this method identifies which pixel line should be used as the basis of comparison with the corresponding line of pixels from the reference frame. Once this most highly correlated line is identified, it is used in the weighting, summing, and determining steps of the method for determining whether the sub-block will be updated.

It will be appreciated that the two methods can be implemented in combination as a single method, or as separate methods. Using the two methods in combination has been found to provide the best protection against both noise and jitter. However, implementing both methods raises costs, and, in particular applications, it may be desirable to implement one method or the other, but not both in combination.

When implementing the methods in combination, it is possible that the comparing step of the Noise Reduction Method can be skipped, since the difference elements are already calculated in the preferred correlation calculation of Jitter Reduction Method. However, it will be appreciated that hardware and software constraints may make it less preferable to hold the difference elements in memory until the Noise Reduction Method is performed. In such a case, the comparison step of the Noise Reduction Method would be performed, even if doing so would replicate the difference elements previously generated in the Jitter Reduction Method.

It will be appreciated that the basic, sum and single-pixel threshold reflect the sensitivity of the system. The lower the thresholds, the more sensitive the system to small change, the greater the amount of update data that is sent to the remote computer, and the more actual changes in video information are properly shown on the remote computer's monitor. However, greater sensitivity also makes the system, including the KVM 14, more susceptible to the effects of noise and jitter. Therefore, the KVM 14 is preferably configured so that the thresholds are programmable (i.e. changeable), so that different conditions (noise level, jitter, type of video information being dealt with, etc.) can be taken into account in choosing the thresholds. Thus, for each execution of the methods, the thresholds are predetermined, but they can preferably be changed between separate executions of the methods to adapt to changing conditions or in response to a change in desired results.

While the foregoing embodiments of the present invention have been set forth in considerable detail for the purpose of making a complete disclosure of the invention, it will be apparent to those skilled in the art that various modifications can be made to the device without departing from the broad scope of the invention as defined in the attached claims. Some of these variations are discussed above and others will be apparent to those skilled in the art.

What is claimed is:

1. A method of determining whether a sub-block has changed so as to require updating, for use in association with a system for updating the video of a remote computer in response to changes in the video of a target computer by comparing a reference video frame from the target computer with a new video frame, wherein updated frame sub-blocks of pixels that each have a set of pixel values associated therewith are sent to the remote computer to update it if it is determined that the sub-block has changed so as to require updating, the method comprising the steps of:

A) for the first horizontal line of the sub-block, performing the following steps:
  (i) comparing each new video frame pixel with each corresponding reference video frame pixel by determining the differences between their corresponding sets of pixel values to produce a difference set of difference elements for each pixel;
  (ii) weighting the absolute value of each difference element within the difference set according to a predetermined weighting rule to produce a weighted difference set of weighted difference elements for the pixel, the weighting rule being configured so that the weight given to any difference element not exceeding a predetermined basic threshold is zero, and the weight given to any difference element exceeding the predetermined basic threshold is greater than zero and is non-decreasing with the size of the absolute value of the difference element, wherein the weighting rule further comprises one of the following configurations: a) a weighting cap, such that the weight given to any difference element increases with the absolute value of the difference element until the weighting cap is reached, b) geometric increase, such that the weighting increases geometrically with each increment of the difference element when the difference element is greater than the basic threshold, or c) arithmetic increase, such that the weighting increases arithmetically with each increment of the difference element when the difference element is greater than the basic threshold;
  (iii) summing the weighted difference elements over all of the pixels of the horizontal line of the sub-block to produce a weighted difference element sum;
  (iv) determining whether the weighted difference element sum exceeds a predetermined sum threshold;
  (v) if yes, determining that the sub-block has changed so as to require updating;

B) repeating step A for the each subsequent horizontal line of the sub-block (I) if and only if step A has not been performed for all of the horizontal lines in the sub-block; and (II) if it has not been determined that the sub-block has changed so as to require updating.

2. A method as claimed in claim 1, wherein the said step B comprises repeating step A for the each subsequent horizontal line of the sub-block (I) if and only if it has not been determined that the sub-block has changed so as to require updating; and (II) if and only if step A has not been performed for all of the horizontal lines in the sub-block.

3. A method as claimed in claim 1, wherein the method comprises the steps, after the said step (ii), of (1) determining whether any weighted difference element exceeds a predetermined single-pixel threshold; (2) if any weighted difference element exceeds a predetermined single-pixel threshold, determining that the sub-block has changed so as to require updating.

4. A system for receiving a video signal from a target computer and updating the video of a remote computer in response to changes in said video signal, the system comprising a KVM device configured to be connectable to a remote computer and a target computer, wherein the KVM device is configured to execute the method as claimed in claim 1.

5. A method as claimed in claim 3, wherein the method further comprises the step, immediately after the said step (2), of proceeding directly to the said step B.

6. A method of operating a KVM system by varying the sensitivity of the KVM system to changes in video information, the method comprising the steps of:
  performing the method as claimed in claim 3; then
  reprogramming at least one of the basic threshold, the sum threshold and the single pixel threshold; then
  performing the method as claimed in claim 3.

* * * * *